United States Patent
Mor (10) Patent No.: US 7,054,264 B2
(45) Date of Patent: May 30, 2006

(54) INTERCONNECT AND GATEWAY PROTECTION IN BIDIRECTIONAL RING NETWORKS

(75) Inventor: Gal Mor, Rishon-Lezion (IL)

(73) Assignee: Corrigent Systems Ltd., Tel Aviv (IL)

( * ) Notice: Subject to any disclaimer, the term of this patent is extended or adjusted under 35 U.S.C. 154(b) by 1008 days.

(21) Appl. No.: 09/910,790

(22) Filed: Jul. 24, 2001

(65) Prior Publication Data

US 2003/0021226 A1    Jan. 30, 2003

(51) Int. Cl.
*G01R 31/08*    (2006.01)
*G06F 11/00*    (2006.01)
*H04J 1/16*    (2006.01)
*H04J 3/14*    (2006.01)
*H04L 12/26*    (2006.01)

(52) U.S. Cl. .................... 370/223; 370/222; 398/1; 398/2; 398/3; 398/4; 398/59; 714/717; 714/799; 714/47; 714/4; 714/2

(58) Field of Classification Search ............... 370/223, 370/222, 254, 403, 227, 258, 225, 216, 217, 370/218, 219, 220, 221, 249, 228, 241, 248, 370/252, 401, 402, 404, 405, 406, 408, 257, 370/229, 465, 224, 452, 453, 238; 714/47, 714/4, 2, 13, 48, 56, 799, 717; 709/238, 709/239; 398/59, 60, 1, 2, 3, 4, 5, 6, 9, 10, 398/17

See application file for complete search history.

(56) References Cited

U.S. PATENT DOCUMENTS

| | | | |
|---|---|---|---|
| 4,527,270 A * | 7/1985 | Sweeton .................. 714/47 |
| 4,561,088 A * | 12/1985 | Champlin et al. .......... 370/222 |
| 4,665,518 A * | 5/1987 | Champlin et al. .......... 370/222 |
| 4,858,232 A * | 8/1989 | Diaz et al. ................. 370/465 |
| 5,159,595 A * | 10/1992 | Flanagan et al. ........... 370/224 |
| 5,218,604 A * | 6/1993 | Sosnosky ................... 370/223 |
| 5,283,782 A | 2/1994 | Takase et al. |
| 5,307,353 A * | 4/1994 | Yamashita et al. ............. 714/4 |
| 5,321,393 A | 6/1994 | Carlton et al. |

(Continued)

FOREIGN PATENT DOCUMENTS

WO    WO 99/04596    1/1999

OTHER PUBLICATIONS

Jogalekar et al, "IP Over Resilient Packet Rings", (Internet Draft, draft-jogalekar-iporpr-00), Nov. 2000 (Available at www.ietf.org).

(Continued)

*Primary Examiner*—Wellington Chin
*Assistant Examiner*—Jamal A. Fox
(74) *Attorney, Agent, or Firm*—Nixon & Vanderhye P.C.

(57) ABSTRACT

A communication device for interconnection of first and second networks, of which at least the first network is a bidirectional ring network, includes first and second interconnect modules, each such module adapted to receive outgoing data traffic on the first network at a data rate not substantially greater than a predetermined maximum rate for one of the ring directions, and to convey the outgoing data traffic to the second network. When a fault occurs in one of the first and second modules, the other module is reconfigured to receive substantially all of the outgoing data traffic and to convey the outgoing data traffic to the second network regardless of whether the outgoing data traffic is transmitted on the first network in the clockwise or in the counterclockwise direction.

24 Claims, 4 Drawing Sheets

U.S. PATENT DOCUMENTS

| | | | |
|---|---|---|---|
| 5,327,427 A * | 7/1994 | Sandesara | 370/222 |
| 5,412,652 A * | 5/1995 | Lu | 370/223 |
| 5,436,886 A | 7/1995 | McGill | |
| 5,596,569 A | 1/1997 | Madonna et al. | |
| 5,638,358 A | 6/1997 | Hagi | |
| 5,661,720 A * | 8/1997 | Taniguchi | 370/223 |
| 5,663,949 A | 9/1997 | Ishibashi et al. | |
| 5,796,717 A | 8/1998 | Shinbashi et al. | |
| 5,815,490 A * | 9/1998 | Lu | 370/223 |
| 5,925,137 A | 7/1999 | Okanoue et al. | |
| 5,933,258 A * | 8/1999 | Flanagan et al. | 398/5 |
| 6,032,194 A | 2/2000 | Gai et al. | |
| 6,075,767 A | 6/2000 | Sakamoto et al. | |
| 6,091,705 A * | 7/2000 | Regula | 370/223 |
| 6,212,161 B1 * | 4/2001 | Regula | 370/223 |
| 6,226,111 B1 * | 5/2001 | Chang et al. | 398/9 |
| 6,233,073 B1 | 5/2001 | Bowers et al. | |
| 6,246,667 B1 | 6/2001 | Ballintine et al. | |
| 6,256,292 B1 * | 7/2001 | Ellis et al. | 370/227 |
| RE37,401 E * | 10/2001 | Yamashita et al. | 714/717 |
| 6,314,102 B1 | 11/2001 | Czerwiec et al. | |
| 6,351,452 B1 | 2/2002 | Koenig et al. | |
| 6,359,858 B1 | 3/2002 | Smith et al. | |
| 6,366,556 B1 | 4/2002 | Ballintine et al. | |
| 6,400,682 B1 * | 6/2002 | Regula | 370/223 |
| 6,438,144 B1 | 8/2002 | Guzikevitz et al. | |
| 6,442,134 B1 * | 8/2002 | Mitchell | 370/223 |
| 6,456,407 B1 * | 9/2002 | Tammela et al. | 398/59 |
| 6,456,587 B1 | 9/2002 | Taniguchi | |
| 6,466,576 B1 | 10/2002 | Sekine et al. | |
| 6,597,689 B1 | 7/2003 | Chiu et al. | |
| 6,636,478 B1 | 10/2003 | Sensel et al. | |
| 6,650,618 B1 * | 11/2003 | Peng et al. | 370/229 |
| 6,680,904 B1 | 1/2004 | Kaplan et al. | |
| 6,680,906 B1 | 1/2004 | Nguyen | |
| 6,680,912 B1 * | 1/2004 | Kalman et al. | 370/238 |
| 6,687,231 B1 | 2/2004 | Czerwiec et al. | |
| 6,707,823 B1 * | 3/2004 | Miyao | 370/406 |
| 6,711,125 B1 * | 3/2004 | Walrand et al. | 370/223 |
| 6,724,880 B1 | 4/2004 | Lynch | |
| 6,728,220 B1 * | 4/2004 | Behzadi | 370/254 |
| 6,731,597 B1 * | 5/2004 | Batchellor et al. | 370/223 |
| 6,748,175 B1 * | 6/2004 | Adams et al. | 398/82 |
| 6,795,394 B1 * | 9/2004 | Swinkels et al. | 370/222 |
| 6,820,210 B1 * | 11/2004 | Daruwalla et al. | 714/4 |
| 6,826,158 B1 * | 11/2004 | Seaman et al. | 370/254 |
| 6,839,514 B1 * | 1/2005 | Sharma et al. | 398/2 |
| 6,865,149 B1 * | 3/2005 | Kalman et al. | 370/225 |
| 6,879,559 B1 | 4/2005 | Blackmon et al. | |
| 6,952,397 B1 * | 10/2005 | Mor et al. | 370/223 |
| 2001/0015961 A1 * | 8/2001 | Iwasaki et al. | 370/258 |
| 2001/0026384 A1 * | 10/2001 | Sakano et al. | 359/124 |
| 2002/0003639 A1 * | 1/2002 | Arecco et al. | 359/119 |
| 2002/0018481 A1 * | 2/2002 | Mor et al. | 370/403 |
| 2002/0048066 A1 * | 4/2002 | Antoniades et al. | 359/128 |
| 2002/0118687 A1 * | 8/2002 | Chow et al. | 370/404 |
| 2002/0176371 A1 * | 11/2002 | Behzadi | 370/254 |
| 2002/0179720 A1 | 12/2002 | Liva et al. | |
| 2002/0186667 A1 * | 12/2002 | Mor et al. | 370/258 |
| 2003/0031126 A1 * | 2/2003 | Mayweather et al. | 370/223 |
| 2003/0088698 A1 | 5/2003 | Singh et al. | |
| 2003/0147344 A1 | 8/2003 | Stewart et al. | |
| 2003/0196135 A1 | 10/2003 | Gottlieb | |

OTHER PUBLICATIONS

Herrera et al, "A Framework for IP Over Packet Transport Rings" (Internet Draft, draft-ietf-ipoptr-framework-00), Feb. 2001 (Available at www.ietf.org).

Tsiang et al, In Request for Comments (RFC) 2892 of the Internet Engineering Task Force (IETF) (Available at www.ietf.org).

IEEE Standard for Information Technology, Telecommunications and Information Exchange between Systems, Local and Metropolitan Are Network, Common Specifications, Part 3: Media Access Control (MAC) Brides, published as ANSI/IEEE Standard 802.1D (1998). Available at: standards.ieee.org/catalog/IEEE802.1.html.

"Amendment 2—Rapid Reconfiguration", Published as IEEE Draft P802.1 w/D10 (Mar. 26, 2001).

"Inverse Multiplexing for ATM (IMA) Specification Version 1.1", ATM FORUM, Online!Mar. 1991.

Papa Del J., et al., "DSLAM—Broadband Digital Subscriber Line Access Multiplexer System", NEC Research and Development, Nippon Electric Ltd. Tokyo, Japan, vol. 40, No. 1, Jan. 1999, pp. 103-107.

UETF RFC 3031, "Multiprotocol Label Switching Architecture", Jan. 2001, (Available at www.ietf.org/rfc.html, Office Action from U.S. Appl. No. 09/876,414 dated Dec. 30, 2004.

Office Action from U.S. Appl. No. 10/211,065 dated Jun. 27, 2005.

Office Action from U.S. Appl. No. 09/941,723 dated Apr. 4, 2005.

Office Action from U.S. Appl. No. 09/941,723 dated Aug. 19, 2005.

"Star Network" "Star Topology" "Mesh Network", Microsoft Computer Dictionary (Fifth Edition), 2002, Microsoft Press.

Null, Linda, The Essentials of Computer Organization and Architecture 2003, Jones and Barlett Computer Science, p. 536.

* cited by examiner

INTERCONNECT AND GATEWAY PROTECTION IN BIDIRECTIONAL RING NETWORKS

FIELD OF THE INVENTION

The present invention relates generally to communication networks, and specifically to high-speed packet rings.

BACKGROUND OF THE INVENTION

Network ring topologies are gaining in popularity, particularly in Internet Protocol (IP) networks. Such networks enable carriers to offer large bandwidth to users in a cost-effective manner. They also lend themselves to fast rerouting in the event of network failures, since two alternative routes—in clockwise and counterclockwise directions—are generally available for connecting any two nodes on the ring. A drawback of traditional ring implementations, such as SONET/SDH, is that one of the directions is designated as the active ring, while the other direction remains on standby for fault protection when needed. In other words, at any given time, all of the nodes in the ring transmit and receive data only in the active direction. Therefore, ordinarily half of the available bandwidth in these rings is reserved for fault protection and is not exploited under normal operating conditions.

Some recently-developed bidirectional protocols provide more efficient bandwidth utilization by enabling data to be transferred between any pair of nodes in either direction around the ring, while maintaining fast protection against faults. The two opposing traffic directions are commonly referred to as an inner ring and an outer ring. It will be understood, however, that in the context of the present patent application and in the claims, the terms "inner" and "outer," as well as "clockwise" and "counterclockwise," are used arbitrarily to distinguish between the two opposing directions of packet flow in a ring network. These terms are chosen solely for convenience of explanation, and do not necessarily bear any relation to the physical characteristics of the network.

The leading bidirectional protocol for high-speed packet rings is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in Request for Comments (RFC) 2892 of the Internet Engineering Task Force (IETF). These documents are incorporated herein by reference. They are available at www.ietf.org. Using protocols such as these, each node in a ring network can communicate directly with all other nodes through either the inner or the outer ring, using the appropriate Media Access Control (MAC) addresses of the nodes.

Neighboring ring networks are commonly interconnected through one or more interconnect nodes. Similarly, an interconnect node on a ring network may connect the ring to another network having a different topology. When the interconnect node links a spur or access ring to a main trunk network, the interconnect node is also referred to as a gateway. In cases in which the interconnect node links two ring networks, the node must typically support four times the bandwidth of a single (clockwise or counterclockwise) ring.

When an interconnect node on a ring network fails, the ring network can become isolated from the other networks to which it is normally connected. Even if multiple interconnect nodes are used to connect two networks, a failure in one of the nodes will affect the connections between the networks that previously passed through the failed node. This problem can be solved by installing an additional node as backup to each interconnecting node, and activating the backup node when the node that is normally active fails. In other words, two nodes are installed at the same site, at substantial added cost and demanding additional space, power and maintenance. Duplication of the node also requires that the active and standby nodes follow a mirroring protocol, so that the standby node will be ready to take over when needed. Because each of the two nodes must be able to carry the full bandwidth of the network interconnection that it supports, the backup node cannot practically be used for load sharing. Therefore, the resources of the backup node are wasted most of the time.

SUMMARY OF THE INVENTION

It is an object of some aspects of the present invention to provide improved communication methods and devices for use in bidirectional ring networks.

It is a further object of some aspects of the present invention to provide interconnect nodes for use in bidirectional ring networks that enable rapid resumption of traffic flow in the case of a failure.

It is a further object of some aspects of the present invention to reduce the levels of hardware complication and cost of interconnect nodes in a bidirectional ring network.

In preferred embodiments of the present invention, a bidirectional ring network comprises an interconnect node that links the ring to another network. The other network may or may not be a ring network, as well. The interconnect node comprises a pair of interconnect modules, both of which are coupled to convey outgoing data packets from the ring to the other network and to convey incoming data packets from the other network to the ring network. Normally, as long as both of the modules are operational, the modules share the load of incoming and outgoing traffic, so that interface bandwidth of each of the modules need not be substantially greater than the maximum data rate of one of the two directional rings in the ring network. This load sharing is preferably accomplished by configuring one of the modules to serve only the clockwise ring, while the other module is configured to serve only the counterclockwise ring. Assuming that the other network to which the interconnect node is linked is also a bidirectional ring network, the same coupling scheme and bandwidth limitations apply to the module connections on both of the networks.

The modules communicate with one another, typically via a protection interface, so that each module can detect failures when they occur in the other module. Preferably, each of the modules is preconfigured with the Media Access Control (MAC) address of the other module, as well as its own MAC address. When one of the modules detects a failure on the protection interface, it immediately begins capturing outgoing packets addressed to the other module. In other words, for as long as the failure persists, the non-failing module accepts outgoing packets on both the clockwise and counterclockwise rings. Upon the occurrence of such a failure, however, the nodes in the network preferably redirect the traffic on the rings in order to circumvent the failed module (typically by wrapping or steering the traffic), as provided by bidirectional ring protocols known in the art. Therefore, the total bandwidth of traffic that the non-failing module must handle is still no greater than the maximum data rate of a single ring. Alternatively, the network operator should ensure that the total volume of guaranteed (high-priority) traffic on both rings through the non-failing module will not exceed the capacity of that module. Other low-priority traffic may be delayed or discarded during the protection time, unless the higher-priority services are not utilizing their allocated bandwidth.

Thus, preferred embodiments of the present invention provide a rapid, effective protection scheme for gateways and other interconnect nodes in bidirectional ring networks, while reducing substantially the bandwidth requirements of such nodes relative to solutions known in the art. Although these preferred embodiments are described with reference to packet networks, and particularly RPR-based networks, it will be appreciated that the principles of the present invention to high-speed data networks of other types.

There is therefore provided, in accordance with a preferred embodiment of the present invention, a communication device for interconnection of first and second networks, of which at least the first network is a ring network over which traffic is transmitted in both clockwise and counterclockwise directions, the device including:

first and second interconnect modules, each such module adapted to receive outgoing data traffic on the first network and to convey the outgoing data traffic to the second network, and to receive incoming data traffic from the second network and to convey the incoming data traffic to the first network, the first and second interconnect modules being in mutual communication so that while both of the modules are operational, the first module is configured to receive from the first network only the outgoing data traffic transmitted in the clockwise direction, while the second module is configured to receive from the first network only the outgoing data traffic transmitted in the counterclockwise direction, and so that when a fault occurs in one of the first and second modules, the other module receives a fault indication, causing the other module to receive substantially all of the outgoing data traffic and to convey the outgoing data traffic to the second network.

Preferably, the first network is configured to carry the data traffic at a predetermined maximum data rate in each of the clockwise and counterclockwise directions, and wherein each of the modules is interfaced to receive the outgoing data traffic at a data rate not substantially greater than the predetermined maximum. Further preferably, both of the first and second modules are configured to transmit the incoming data traffic over the first network in both the clockwise and counterclockwise directions while both of the modules are operational, as well as when the fault occurs.

In a preferred embodiment, when the fault occurs in one of the modules, the other module is adapted to receive the outgoing data traffic transmitted in the both clockwise and the counterclockwise directions. Preferably, the fault occurs in one of the modules, the other module is adapted to wrap the traffic between the clockwise and counterclockwise directions, away from the module in which the fault occurred.

Preferably, each of the first and second modules is configured with Media Access Control (MAC) addresses assigned to both the first and second modules, and is controlled so that while both of the modules are operational, each of the modules receives only the outgoing data traffic destined to its own MAC address, and so that when the fault occurs in one of the modules, the other module receives the outgoing data traffic destined to both of the MAC addresses.

In a preferred embodiment, the first network includes an access ring network, while the second network includes a trunk network, and the first and second modules are configured to serve as a gateway node between the access ring network and the trunk network. In another preferred embodiment, the first and second networks respectively include first and second ring networks, and the interconnect modules are configured to convey and receive the traffic to and from the second network in a manner substantially similar to that in which the modules convey and receive the traffic to and from the first network. Alternatively, the second network is not a ring network.

There is also provided, in accordance with a preferred embodiment of the present invention, a communication device for interconnection of first and second networks, of which at least the first network is a ring network over which traffic is transmitted in both clockwise and counterclockwise directions, with a predetermined maximum data rate in each of the clockwise and counterclockwise directions, the device including:

first and second interconnect modules configured with Media Access Control (MAC) addresses assigned respectively to both the first and second modules, each such module being adapted to receive outgoing data traffic on the first network at a data rate not substantially greater than the predetermined maximum and to convey the outgoing data traffic to the second network, and to receive incoming data traffic from the second network and to convey the incoming data traffic to the first network, the first and second interconnect modules being in mutual communication so that while both of the modules are operational, each of the modules receives only the outgoing data traffic destined to its own MAC address, and so that when a fault occurs in one of the first and second modules, the other module receives a fault indication, causing the other module to receive the outgoing data traffic destined to both of the MAC addresses and to convey the outgoing data traffic to the second network.

There is additionally provided, in accordance with a preferred embodiment of the present invention, a method for communication between first and second networks, of which at least the first network is a ring network over which traffic is transmitted in both clockwise and counterclockwise directions, the method including:

coupling the first and second networks together via first and second interconnect modules, such that while both of the modules are operational, the first module receives outgoing traffic from the first network for transmission over the second network only in the clockwise direction on the first network, while the second module receives outgoing traffic from the first network for transmission over the second network only in the counterclockwise direction on the first network; and upon occurrence of a fault in one of the first and second modules, reconfiguring the other of the modules so as to receive substantially all of the outgoing traffic for transmission over the second network.

There is further provided, in accordance with a preferred embodiment of the present invention, a method for communication between first and second networks, of which at least the first network is a ring network over which traffic is transmitted in both clockwise and counterclockwise directions, with a predetermined maximum data rate in each of the clockwise and counterclockwise directions, the method including:

coupling the first and second networks together via first and second interconnect modules;

assigning respective Media Access Control (MAC) addresses to the first and second modules and configuring each of the first and second modules with the MAC addresses of both of the modules, such that while both of the modules are operational, each of the modules receives outgoing data traffic on the first network destined to its own MAC address at a data rate not substantially greater than the predetermined maximum and conveys the outgoing data traffic to the second network; and upon occurrence of a fault in one of the first and second modules, setting the other module to receive the outgoing traffic destined to both of the MAC addresses and to convey the outgoing data traffic to the second network.

The present invention will be more fully understood from the following detailed description of the preferred embodiments thereof, taken together with the drawings in which:

DETAILED DESCRIPTION OF PREFERRED EMBODIMENTS

Figure 1:
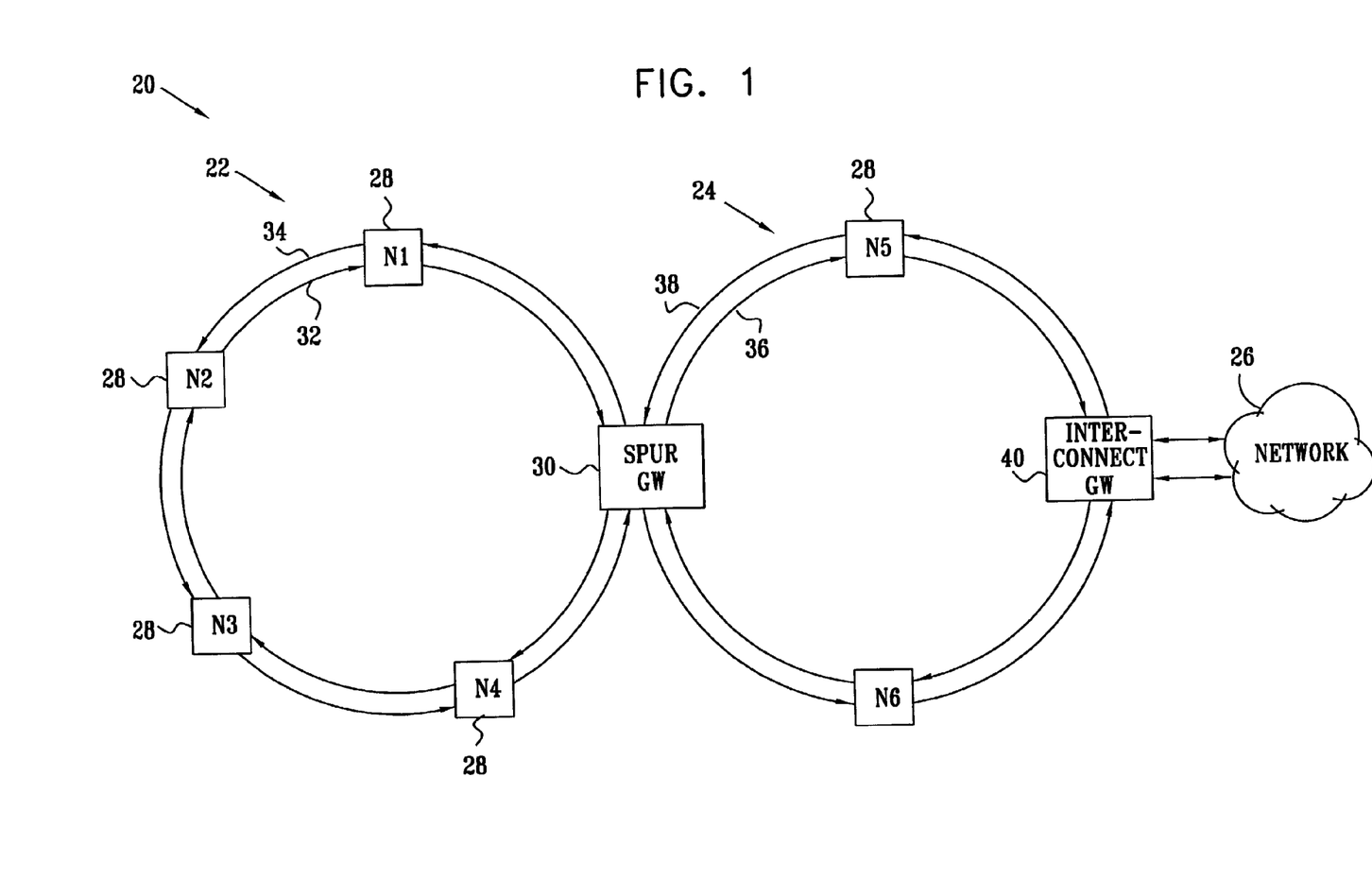
FIG. 1 is a block diagram that schematically illustrates a system of ring networks, in accordance with a preferred embodiment of the present invention.

FIG. 1 is a block diagram that schematically shows a network communication system 20, in accordance with a preferred embodiment of the present invention. System 20 comprises an access (or "spur") ring network 22, which is coupled to a trunk (or "metro") ring network 24 by a spur gateway 30. Network 24 is in turn coupled to another network 26, which is not necessarily a ring network, by an interconnect gateway 40. Gateways 30 and 40 are also referred to herein as interconnect nodes. The topology of system 20 is shown here by way of example, for illustrating the operation of gateways 30 and 40, and the extension of the principles described herein to other topologies will be apparent to those skilled in the art.

In addition to gateways 30 and 40, networks 22 and 24 typically comprise nodes 28. The nodes in each network are mutually connected by bidirectional communication media, such as optical fibers or conductive wires. The nodes typically comprise switching equipment, and serve as either access points or gateways to other networks (aggregation points). The communication media in network 22 are configured to define an inner ring 32, over which packets are conveyed between the nodes in a clockwise direction, and an outer ring 34, over which the packets are conveyed in a counterclockwise direction. Similarly, network 24 comprises an inner ring 36 and an outer ring 38. Preferably, both networks 22 and 24 operate in accordance with the RPR protocol described in the Background of the Invention, or with another, similar bidirectional protocol. As noted above, the designations of "inner," "outer," "clockwise" and "counterclockwise" are arbitrary and are used here simply for convenience and clarity of explanation.

Figure 2:
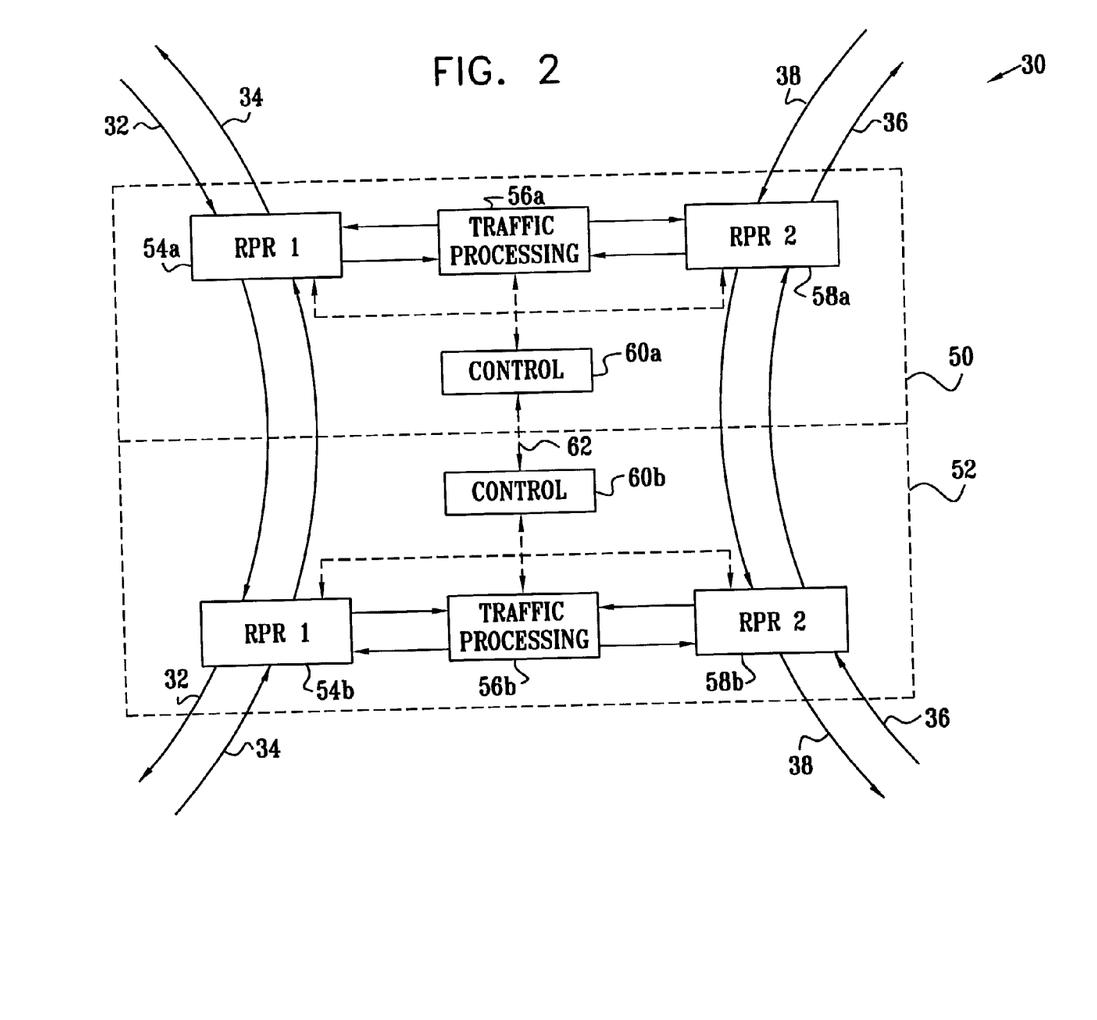
FIG. 2 is a block diagram that schematically illustrates a gateway node in a ring network, in accordance with a preferred embodiment of the present invention.

FIG. 2 is a block diagram that schematically illustrates details of gateway 30, in accordance with a preferred embodiment of the present invention. Gateway 30 comprises two modules 50 and 52, which are preferably substantially identical. Each module comprises a RPR block 54, connected to transmit and receive data packets over both of rings 32 and 34. The RPR block in module 50 is marked as block 54a, while the RPR block in module 52 is marked as block 54b. A similar numbering scheme is used to refer to the other blocks in modules 50 and 52, as described hereinbelow.

Block 54 in each module is responsible for ring management and performs the MAC-layer functions of capturing packets that are addressed to gateway 30, while passing all other traffic through to the next node along the ring. Each of modules 50 and 52 typically has its own MAC address to which packets may be sent by nodes 28 on both ring 32 and ring 34. Preferably, blocks 54a and 54b are both preconfigured with the MAC addresses of both of the modules. In normal operation, only one of the MAC addresses is active in each of the blocks, and network 22 is preferably configured so that block 54a captures outgoing packets (destined for network 24) only on ring 32, while block 54b captures outgoing packets only on ring 34. Alternatively, the operator of the network may balance the outgoing traffic in other ways, so that both blocks 54a and 54b capture certain outgoing traffic flows on both of the rings. In either case, both blocks 54a and 54b can preferably transmit incoming data packets (received from network 24) on both of rings 32 and 34.

When one of RPR blocks 54 captures a packet addressed to gateway 30, it delivers the packet to a respective traffic processing block 56. This block is typically implemented as a network processor chip that is able to access higher-layer protocol headers at wire speed (to avoid bottlenecks). It is responsible for network-layer functions, such as IP processing, and optionally other higher-level functions, as well, such as Quality of Service (QoS) and network security. Since each of blocks 54 captures packets only on a single one of rings 32 and 34, the bandwidth of blocks 54 and 56 and of the interface between them (at least for outgoing traffic to network 24) need not be any greater than the bandwidth of one of the rings. It will be shown below that this bandwidth is sufficient not only for normal operation, during which both of modules 50 and 52 are active, but also for operation under failure conditions, in which one of the modules serves as a backup for the other one.

Traffic processing block 56 passes outgoing packets from network 22 to a second RPR block 58 on network 24. The functions and interaction of RPR blocks 58a and 58b, with respect to receiving and transmitting packets on inner ring 36 and outer ring 38 of network 24, are substantially similar to those of RPR blocks 54a and 54b on network 22.

A controller 60, typically a suitable microprocessor, monitors and controls the operation of blocks 54, 56 and 58 in each of modules 50 and 52. Controllers 60a and 60b in the two modules exchange signals via a protection interface 62. Normally, the controllers signal one another regularly to indicate that the respective modules are functioning properly. When a fault occurs in one of the modules, the respective controller may signal the other controller via interface 62 to indicate that the module at fault cannot handle packet traffic, so that the other module should take over receiving the traffic on both rings. Alternatively, one of controllers 60 may sense that there is no response from the other controller, possibly indicating a total failure of the other module, or one of RPR blocks 54a and 54b may receive a failure indication from the other block. Other methods of failure detection will be apparent to those skilled in the art. In all of these cases, the functioning module will take over receiving the traffic destined for the failed module.

The internal structure of gateway 30 is shown in FIG. 2 for the purpose of exemplifying the operation of the present invention in connecting ring networks 22 and 24. It will be understood that the methods of the present invention may be implemented using other architectures, whether for interconnecting different ring networks as in the present example or for interconnecting a ring network with another network of different topology. For instance, gateway 40, coupling networks 24 and 26, preferably comprises a pair of modules (not shown) with RPR blocks on network 24, similar to blocks 54 shown in FIG. 2. On the side connecting to network 26, however, in place of RPR blocks 56, the modules of gateway 40 will have MAC blocks appropriate to the structure and protocols of network 26. Preferably, these modules also comprise appropriate traffic processing blocks, controllers and a protection interface, as described above, in order to carry out the protection functions of the present invention.

Figure 3A:
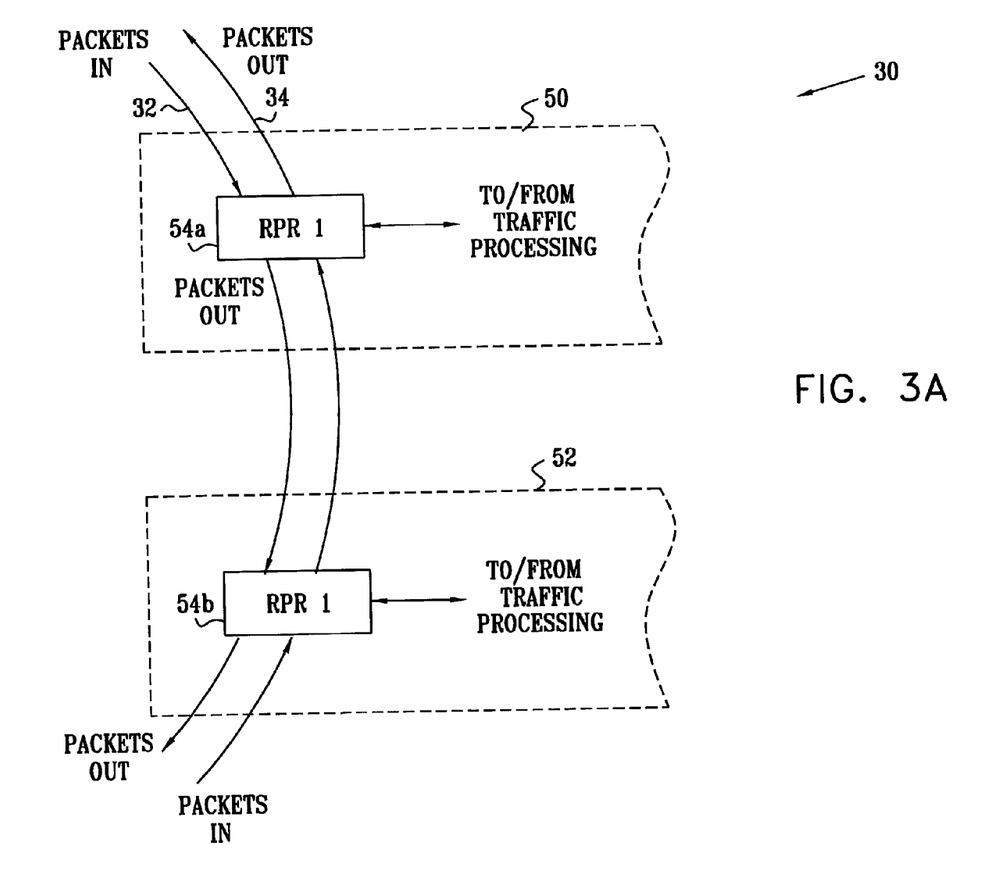
FIGS. 3A and 3B are block diagrams that schematically show details of the operation of the gateway node of FIG. 2, in accordance with a preferred embodiment of the present invention.
Figure 3B:
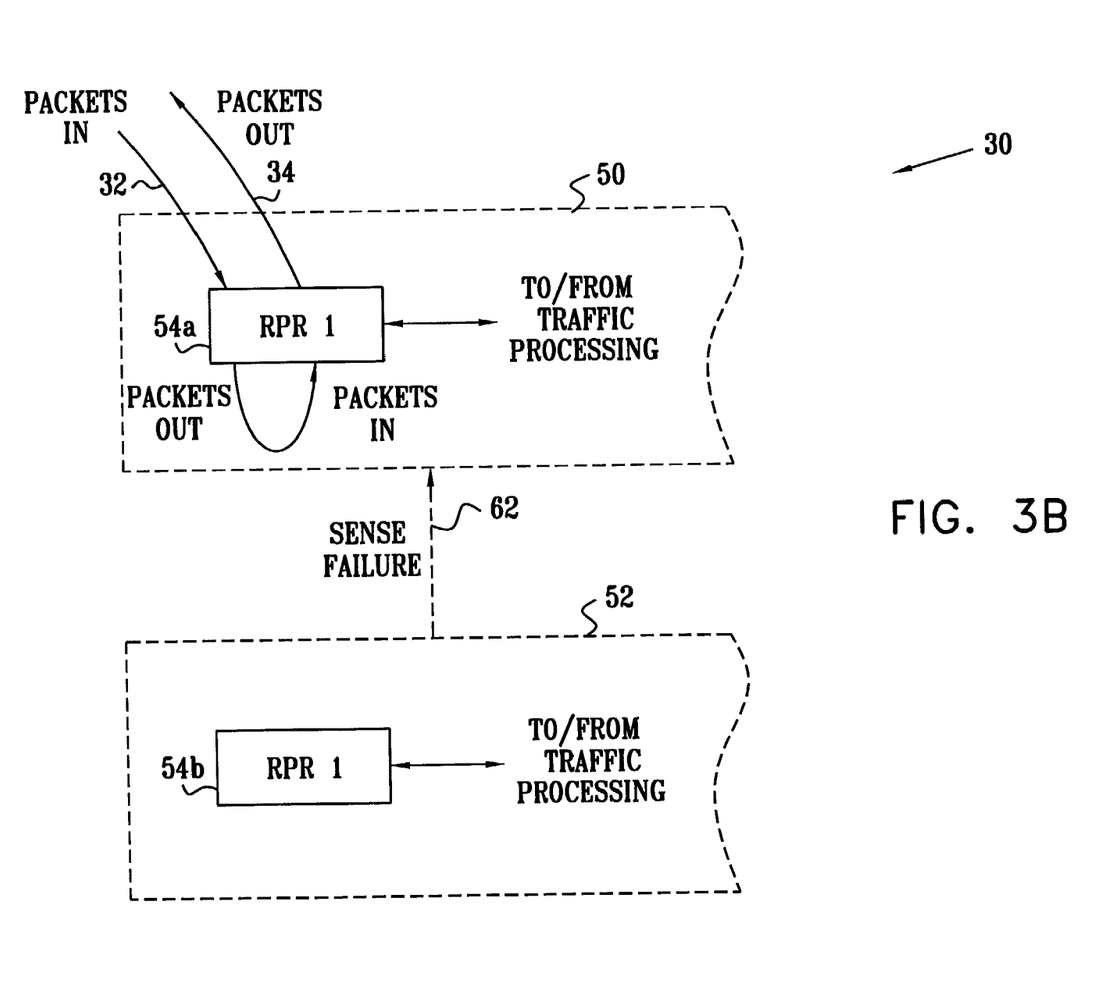

FIGS. 3A and 3B are block diagrams showing further details of gateway 30, useful in understanding a method of protection implemented by the gateway, in accordance with a preferred embodiment of the present invention. FIG. 3A represents normal operation of gateway 30, during which both modules 50 and 52 are operational. Under these conditions, RPR block 54a is preferably set to receive outgoing packets only on inner ring 32, while RPR block 54b is preferably set to receive outgoing packets only on outer ring 34 (although other divisions of traffic flow are also possible). As noted above, each of the RPR blocks captures packets addressed to only one of the MAC addresses of gateway 30, although both RPR blocks are configured in advance with both of the addresses. Both RPR blocks 54a and 54b can transmit incoming packets to nodes 28 on either of rings 32 and 34.

FIG. 3B illustrates the behavior of gateway 30 when a failure occurs in module 52, which is sensed by module 50 via protection interface 62 or by some other error indication. In accordance with the RPR protocol, as well as other bidirectional ring protocols known in the art, as soon as the nodes in network 22 become aware of the failure of module 52, the nodes on either side of the failed module wrap traffic away from it, or drop packets that were destined to pass through the failed module and steer traffic away from it. Thus, when wrapping is used, RPR block 54a of module 50 wraps traffic from inner ring 32 back onto outer ring 34, as shown in FIG. 3B, while node N4 (FIG. 1, not shown in FIG. 3B) wraps traffic from outer ring 34 onto inner ring 32. Alternatively, when steering is used, block 54a drops traffic arriving on inner ring 32 that was destined to pass through module 52, and node N4 drops traffic arriving on outer ring 34 that was destined to pass through module 52. In either case, as long as the failure persists, packets reach RPR block 54a only on inner ring 32, at a data rate no greater than the bandwidth of the inner ring.

Meanwhile, controller 60a instructs RPR block 54a to begin capturing outgoing packets carrying the MAC address that is ordinarily assigned to module 52, rather than ignoring these packets as in normal operation. Since the RPR blocks are preconfigured with the MAC addresses of both of the modules in gateway 30, block 54a can implement this controller instruction automatically and very rapidly, typically within no more than 50 ms. This protection speed is comparable to that of standard unidirectional ring implementations, such as those based on SONET/SDH. At the same time, because of the inherent bandwidth limitation imposed by the wrapping mechanism shown in FIG. 3B or by the alternative steering mechanism, this rapid protection does not require that modules 50 and 52 have any more bandwidth than would be required of the active and standby modules in a unidirectional ring gateway.

Although preferred embodiments are described herein with reference to certain specific types of networks and protocols, and particularly to packet networks based on the RPR protocol, the principles of the present invention are similarly applicable in bidirectional ring networks and protocols of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A communication device for interconnection of first and second networks, of which at least the first network is a ring network over which traffic is transmitted in both clockwise and counterclockwise directions, the device comprising:

first and second interconnect modules, each such module adapted to receive outgoing data traffic on the first network and to convey the outgoing data traffic to the second network, and to receive incoming data traffic from the second network and to convey the incoming data traffic to the first network, the first and second interconnect modules being in mutual communication so that while both of the modules are operational, the first module is configured to receive from the first network only the outgoing data traffic transmitted in the clockwise direction, while the second module is configured to receive from the first network only the outgoing data traffic transmitted in the counterclockwise direction, and so that when a fault occurs in one of the first and second modules, the other module receives a fault indication, causing the other module to receive substantially all of the outgoing data traffic and to convey the outgoing data traffic to the second network, wherein the first network is configured to carry the data traffic at a predetermined maximum data rate in each of the clockwise and counterclockwise directions, and wherein each of the modules is interfaced to receive the outgoing data traffic at a data rate not substantially greater than the predetermined maximum.

2. A device according to claim 1, wherein both of the first and second modules are configured to transmit the incoming data traffic over the first network in both the clockwise and counterclockwise directions while both of the modules are operational, as well as when the fault occurs.

3. A device according to claim 1, wherein when the fault occurs in one of the modules, the other module is adapted to receive the outgoing data traffic transmitted in the both clockwise and the counterclockwise directions.

4. A device according to claim 3, wherein when the fault occurs in one of the modules, the other module is adapted to wrap the traffic between the clockwise and counterclockwise directions, away from the module in which the fault occurred.

5. A device according to claim 1, wherein each of the first and second modules is configured with Media Access Control (MAC) addresses assigned to both the first and second modules, and is controlled so that while both of the modules are operational, each of the modules receives only the outgoing data traffic destined to its own MAC address, and so that when the fault occurs in one of the modules, the other module receives the outgoing data traffic destined to both of the MAC addresses.

6. A device according to claim 1, wherein the first network comprises an access ring network, while the second network comprises a trunk network, and wherein the first and second modules are configured to serve as a gateway node between the access ring network and the trunk network.

7. A device according to claim 1, wherein the first and second networks respectively comprise first and second ring networks, and wherein the interconnect modules are configured to convey and receive the traffic to and from the second network in a manner substantially similar to that in which the modules convey and receive the traffic to and from the first network.

8. A device according to claim 1, wherein the second network is not a ring network.

9. A communication for device for interconnection of first and second networks, of which at least the first network is a ring network over which traffic is transmitted in both clockwise and counterclockwise directions, with a predetermined maximum data rate in each of the clockwise and counterclockwise directions, the device comprising:
  first and second interconnect modules configured with Media Access Control (MAC) addresses assigned respectively to both the first and second modules, each such module being adapted to receive outgoing data traffic on the first network at a data rate not substantially greater than the predetermined maximum and to convey the outgoing data traffic to the second network, and to receive incoming data traffic from the second network and to convey the incoming data traffic to the first network,
  the first and second interconnect modules being in mutual communication so that while both of the modules are operational, each of the modules receives only the outgoing data traffic destined to its own MAC address, and so that when a fault occurs in one of the first and second modules, the other module receives a fault indication, causing the other module to receive the outgoing data traffic destined to both of the MAC addresses and to convey the outgoing data traffic to the second network.

10. A device according to claim 9, wherein the first network comprises an access ring network, while the second network comprises a trunk network, and wherein the first and second modules are configured to serve as a gateway node between the access ring network and the trunk network.

11. A device according to claim 9, wherein the first and second networks respectively comprise first and second ring networks, and wherein the interconnect modules are configured to convey and receive the traffic to and from the second network in a manner substantially similar to that in which the modules convey and receive the traffic to and from the first network.

12. A device according to claim 9, wherein the second network is not a ring network.

13. A method for communication between first and second networks, of which at least the first network is a ring network over which traffic is transmitted in both clockwise and counterclockwise directions, the method comprising:
  coupling the first and second networks together via first and second interconnect modules, such that while both of the modules are operational, the first module receives outgoing traffic from the first network for transmission over the second network only in the clockwise direction on the first network, while the second module receives outgoing traffic from the first network for transmission over the second network only in the counterclockwise direction on the first network; and
  upon occurrence of a fault in one of the first and second modules, reconfiguring the other of the modules so as to receive substantially all of the outgoing traffic for transmission over the second network,
  wherein the first network is configured to carry the data traffic at a predetermined maximum data rate in each of the clockwise and counterclockwise directions, and wherein coupling the first and second networks comprises interfacing each of the modules to receive the outgoing traffic at a data rate not substantially greater than the predetermined maximum.

14. A method according to claim 13, wherein coupling the first and second networks comprises configuring both of the first and second modules to transmit the incoming traffic over the first network in both the clockwise and counterclockwise directions while both of the modules are operational as well as upon occurrence of the fault.

15. A method according to claim 13, wherein coupling the first and second networks comprises assigning respective Media Access Control (MAC) addresses to the first and second modules and configuring each of the first and second modules with the MAC addresses of both of the modules, such that while both of the modules are operational, each of the modules receives only the outgoing traffic destined to its own MAC address, and wherein reconfiguring the other of the modules comprises setting the other module to receive the outgoing traffic destined to both of the MAC addresses.

16. A method according to claim 13, wherein reconfiguring the other of the modules comprises reconfiguring the module to receive the outgoing traffic in both the clockwise and counterclockwise directions on the first network.

17. A method according to claim 16, wherein reconfiguring the other of the modules comprises wrapping the traffic between the clockwise and counterclockwise directions away from the module in which the fault occurred.

18. A method according to claim 13, wherein the first network comprises an access ring network, while the second network comprises a trunk network, and wherein coupling the first and second networks comprises coupling a gateway node between the access ring network and the trunk network.

19. A method according to claim 13, wherein the first and second networks respectively comprise first and second ring networks, and wherein coupling the first and second networks comprises configuring the modules to convey and receive the traffic to and from the second network in a manner substantially similar to that in which the modules convey and receive the traffic to and from the first network.

20. A method according to claim 13, wherein the second network is not a ring network.

21. A method for communication between first and second networks, of which at least the first network is a ring network over which traffic is transmitted in both clockwise and counterclockwise directions, with a predetermined maximum data rate in each of the clockwise and counterclockwise directions, the method comprising:

coupling the first and second networks together via first and second interconnect modules;

assigning respective Media Access Control (MAC) addresses to the first and second modules and configuring each of the first and second modules with the MAC addresses of both of the modules, such that while both of the modules are operational, each of the modules receives outgoing data traffic on the first network destined to its own MAC address at a data rate not substantially greater than the predetermined maximum and conveys the outgoing data traffic to the second network; and upon occurrence of a fault in one of the first and second modules, setting the other module to receive the outgoing traffic destined to both of the MAC addresses and to convey the outgoing data traffic to the second network.

22. A method according to claim 21, wherein the first network comprises an access ring network, while the second network comprises a trunk network, and wherein coupling the first and second networks comprises coupling a gateway node between the access ring network and the trunk network.

23. A method according to claim 21, wherein the first and second networks respectively comprise first and second ring networks, and wherein coupling the first and second networks comprises configuring the modules to convey and receive the traffic to and from the second network in a manner substantially similar to that in which the modules convey and receive the traffic to and from the first network.

24. A method according to claim 21, wherein the second network is not a ring network.

* * * * *